(12) United States Patent
Syong et al.

(10) Patent No.: US 12,100,163 B2
(45) Date of Patent: Sep. 24, 2024

(54) OBJECT TRACKING METHOD AND OBJECT TRACKING APPARATUS

(71) Applicant: ASPEED Technology Inc., Hsinchu (TW)

(72) Inventors: Jyun-Kai Syong, Hsinchu (TW); Chen-Wei Chou, Hsinchu (TW)

(73) Assignee: ASPEED Technology Inc., Hsinchu (TW)

( * ) Notice: Subject to any disclaimer, the term of this patent is extended or adjusted under 35 U.S.C. 154(b) by 561 days.

(21) Appl. No.: 17/412,272

(22) Filed: Aug. 26, 2021

(65) Prior Publication Data

US 2023/0022221 A1 Jan. 26, 2023

(30) Foreign Application Priority Data

Jul. 14, 2021 (TW) .................................. 110125898

(51) Int. Cl.
*G06T 7/20* (2017.01)
*G06V 10/25* (2022.01)
(52) U.S. Cl.
CPC ................ *G06T 7/20* (2013.01); *G06V 10/25* (2022.01); *G06V 2201/07* (2022.01)

(58) Field of Classification Search
CPC ........... G06T 7/20; G06T 7/248; G06V 10/25; G06V 2201/07; G06V 10/62
See application file for complete search history.

(56) References Cited

U.S. PATENT DOCUMENTS

| 9,852,511 B2 | 12/2017 | Gao et al. | |
| 2014/0044307 A1* | 2/2014 | Kenagy | G06F 40/56 |
| | | | 382/103 |
| 2019/0114804 A1* | 4/2019 | Sundaresan | G06T 7/74 |

* cited by examiner

*Primary Examiner* — John R Wallace
(74) *Attorney, Agent, or Firm* — JCIPRNET (57) ABSTRACT

An object tracking method and an object tracking apparatus, which are adapted for a low latency application, are provided. In the method, an object detection is performed on one of continuous image frames. The objection detection is configured to identify a target. The continuous image frames are temporarily stored. An objection tracking is performed on the temporarily stored continuous image frames according to a result of the object detection. The objection tracking is configured to associate the target in one of the continuous image frames with the target in another of the continuous image frames. Accordingly, the accuracy of object tracking may be improved, and the requirement for low latency may be satisfied.

16 Claims, 6 Drawing Sheets

OBJECT TRACKING METHOD AND OBJECT TRACKING APPARATUS

CROSS-REFERENCE TO RELATED APPLICATION

This application claims the priority benefit of Taiwan application serial no. 110125898, filed on Jul. 14, 2021. The entirety of the above-mentioned patent application is hereby incorporated by reference herein and made a part of this specification.

BACKGROUND

Technical Field

The disclosure relates to an image processing technology, and more particularly, relates to an object tracking method and an object tracking apparatus.

Description of Related Art

Object detection and object tracking are important researches in the computer vision technology, and have been widely used in fields such as video calls, medical treatment, driving assistance, and security.

The main function of object detection is to identify the type of the object in the region of interest (ROI). There are many algorithms for object detection. For example, YOLO (You Only Look Once) is a neural network algorithm, and has the characteristics of light weight and high efficiency. It is worth noting that in the architecture of version 3 (V3) of YOLO, the upsampling layer may learn more subtle features, thereby helping to detect smaller objects. For another example, RetinaFace is mainly for human face detection. RetinaFace may provide single-stage dense face localization in natural scenes, using the feature pyramid network (FPN) to be responsible for faces of different sizes (for example, much smaller faces), and adopting multi-task loss, thereby providing higher accuracy for human face detection. For still another example, adaptive boosting (AdaBoost) uses the wrong samples of the previous classifier to train the next classifier, and adds a weak classifier to improve the classification results, thereby having a higher sensitivity to abnormal data or noise data.

On the other hand, the main function of object tracking is to track the same objects selected by the front and back image frames. There are also many algorithms for object tracking. For example, the optical flow method detects changes in the intensity of image pixels over time to infer the moving speed and direction of the object. However, the optical flow method is easy to be misjudged by the influence of light changes and other objects. For another example, the minimum output sum of squared error (MOSSE) filter uses the correlation between the region to be detected and the tracking target to determine the region to be detected as the tracking target. It is worth noting that the MOSSE filter may update the filter parameters for the occluded tracking target, so that the tracking target may be tracked again when the tracking target reappears. For still another example, the scale invariant feature transform (SIFT) algorithm determines the position, scale, and rotational invariant of feature points and generates feature vectors correspondingly, and determines the position and direction of the target by matching the feature vectors.

Generally speaking, object detection is time-consuming compared to object tracking, but the result of object tracking may be inaccurate. In some application scenarios, both technologies may affect the user experience. For example, the application scenario of real-time video conferencing has requirements for low latency. If the object detection takes too long, the moving object may not be accurately selected. For example, object detection cannot obtain the frame selection result in the first frame until four subsequent frames have been displayed. However, the position of the target has changed between the four frames, and the frame selection result in the fourth frame displayed in real time is inaccurate, or the tracking target is incorrect. As a result, the existing technology still needs to be improved for the requirements for low latency and high accuracy.

SUMMARY

In view of this, the embodiments of the disclosure provide an object tracking method and an object tracking apparatus, which perform a continuous tracking based on a result of an object detection, thereby satisfying a requirement for low latency and providing high accuracy.

The object tracking method in the embodiment of the disclosure is adapted for a low latency application, and includes (but is not limited to) the following steps. An object detection is performed on one of one or more continuous image frames. The object detection is configured to identify a target. The continuous image frames are temporarily stored. An object tracking is performed on the temporarily stored continuous image frames according to a result of the object detection. The object tracking is configured to associate the target in one of the continuous image frames with the target in another of the continuous image frames.

The object tracking apparatus in the embodiment of the disclosure is adapted for a low latency application, and includes (but is not limited to) a storage and a processor. The storage is configured to store a program code. The processor is coupled to the storage. The processor is configured to load and execute the program code, so as to execute the following steps. An object detection is performed on one of one or more continuous image frames. The continuous image frames are temporarily stored. An object tracking is performed on the temporarily stored continuous image frames according to a result of the object detection. The object detection is configured to identify a target. The object tracking is configured to associate the target in one of the continuous image frames with the target in another of the continuous image frames.

Based on the above, according to the object tracking method and the object tracking apparatus in embodiments of the disclosure, the continuous image frames are temporarily stored in the process of the object detection. After the result of the object detection is obtained, the temporarily stored continuous image frames are tracked based on the result. In this way, the high accuracy of the object detection and the high efficiency of the object tracking may be combined, and the requirement for the low latency application may be satisfied.

In order for the aforementioned features and advantages of the disclosure to be more comprehensible, embodiments accompanied with drawings are described in detail below.

DETAILED DESCRIPTION OF DISCLOSED EMBODIMENTS

Figure 1:
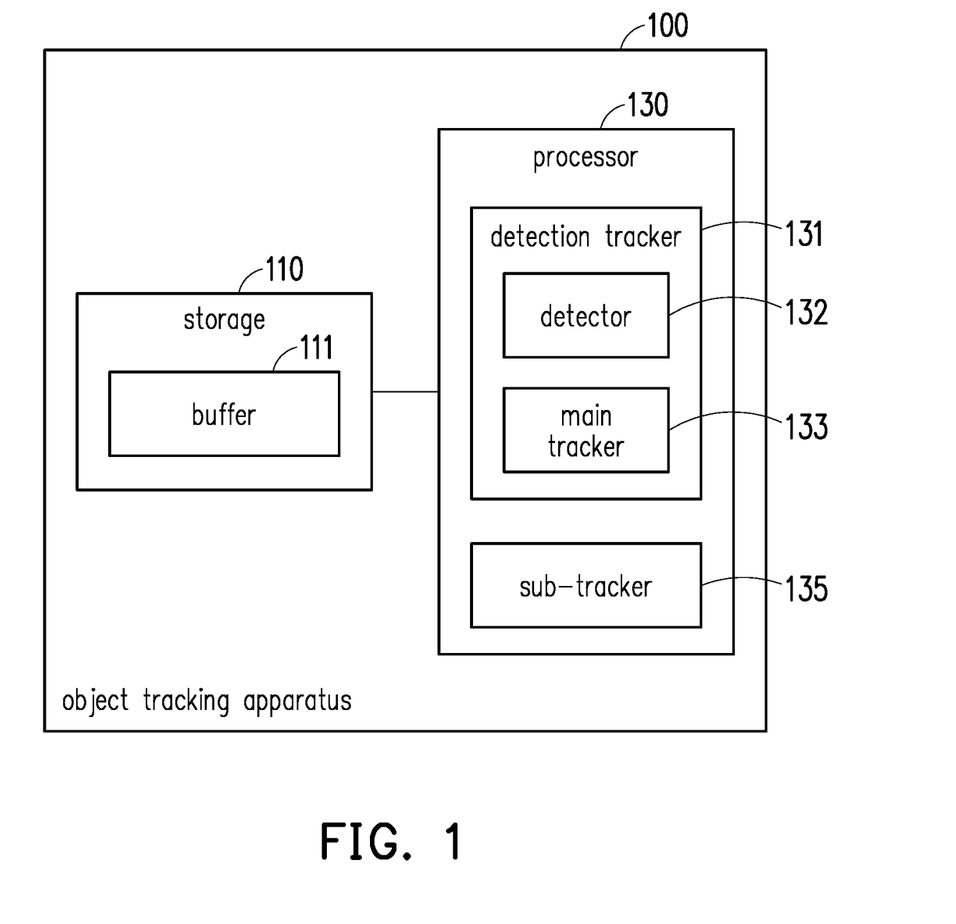
FIG. 1 is a block view of components of an object tracking apparatus according to an embodiment of the disclosure.

FIG. 1 is a block view of components of an object tracking apparatus 100 according to an embodiment of the disclosure. Referring to FIG. 1, the object tracking apparatus 100 includes (but is not limited to) a storage 110 and a processor 130. The object tracking apparatus 100 may be a desktop computer, a laptop (notebook) computer, a smart phone, a tablet computer, a server, a monitoring apparatus, a medical inspection instrument, an optical inspection instrument, or other computing apparatuses.

The storage 110 may be any types of fixed or removable random access memory (RAM), a read only memory (ROM), a flash memory, a conventional hard disk drive (HDD), a solid-state drive (SSD), or similar components. In an embodiment, the storage 110 is configured to record a program code, a software module, a configuration, data (for example, an image frame, a detection/tracking result, a confidence level, etc.), or other files, and the embodiment thereof will be described in detail later.

In an embodiment, the storage 110 includes a buffer 111. The buffer 111 may be one of the one or more storages 110, and may also denote one or more memory blocks in the storage 110. The buffer 111 is configured to temporarily store the image frame, and its function will be described in detail in the subsequent embodiments. The one or more image frames may be provided by a wired or wirelessly connected image capturing apparatus (for example, a camera, a video camera, or a surveillance camera), a server (for example, an image streaming server or a cloud server), or a storage medium (for example, a flash drive, a hard drive, or a database server).

The processor 130 is coupled to the storage 110. The processor 130 may be a central processing unit (CPU), a graphic processing unit (GPU), other programmable general-purpose or special-purpose microprocessors, a digital signal processor (DSP), a programmable controller, a field programmable gate array (FPGA), an application-specific integrated circuit (ASIC), a neural network accelerator, other similar components, or a combination of the above components. In an embodiment, the processor 130 is configured to perform all or a part of operations of the object tracking apparatus 100, and may load and execute the program code, the software module, the file, and the data recorded by the storage 110. In some embodiments, a function of the processor 130 may be achieved through software.

The processor 130 includes a detection tracker 131 and a sub-tracker 135. Either or both of the detection tracker 131 and the sub-tracker 135 may be achieved by an independent digital circuit, a chip, the neural network accelerator, or other processors. In addition, functions thereof may be achieved by software.

In an embodiment, the detection tracker 131 includes a detector 132 and a main tracker 133. The detector 132 is configured to perform an object detection. The object detection, for example, is to determine a region of interest (ROI) (or a bounding box and a bounding rectangle) corresponding to a target (for example, a human, an animal, a non-living body, or an object of a part thereof) in the image frame. As a result, a type of the target (for example, a male or female, a dog or cat, a table or chair, a car or signal light, etc.) is identified. The detector 132 may, for example, apply an algorithm based on a neural network (for example, YOLO, a region based convolutional neural network (R-CNN), or a fast R-CNN (fast CNN), or an algorithm based on feature matching (for example, a histogram of oriented gradient (HOG), Harr, or a feature comparison of speeded up robust features (SURF)) to achieve the object detection. It should be noted that the embodiment of the disclosure does not limit the algorithm applied by the detector 132.

In an embodiment, the main tracker 133 and the sub-tracker 135 are configured to perform an object tracking. The object tracking is configured to associate the target in one of continuous image frames with the target in another of the continuous image frames. The continuous image frames denote the continuous image frames of a video or a video stream. The object tracking, for example, is to determine a correlation of a position, a movement, a direction, and other motions of the same target (in which a corresponding position may be selected by the region of interest) in the adjacent image frames, and then locate the moving target. The main tracker 133 and the sub-tracker 135 may, for example, apply an optical flow method, a simple online and realtime tracking (SORT) method, a deep SORT method, a joint detection and embedding (JDE) model, or other tracking algorithms to achieve the object tracking. It should be noted that the embodiment of the disclosure does not limit the algorithms applied by the main tracker 133 and the sub-tracker 135, and the main tracker 133 and the sub-tracker 135 may use the same or different algorithms.

In some embodiments, the object tracking apparatus 100 may further include a display (not shown). The display is coupled to the processor 130. The display may be a liquid-crystal display (LCD), a light-emitting diode (LED) display, an organic light-emitting diode (OLED), a quantum dot display, or other types of displays. In an embodiment, the display is configured to display the image frame or the image frame through the object detection/tracking.

Hereinafter, various apparatuses, components, and/or modules in the object tracking apparatus 100 will be used to describe a method according to the embodiment of the disclosure. Each of the processes of the method may be adjusted accordingly according to the implementation situation, and the disclosure is not limited thereto.

Figure 2:
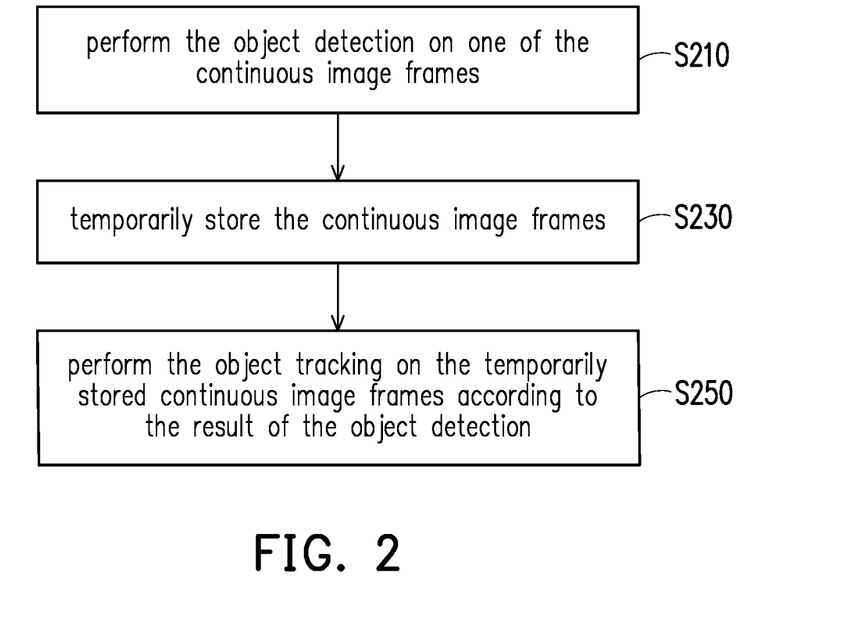
FIG. 2 is a flowchart of an object tracking method according to an embodiment of the disclosure.

FIG. 2 is a flowchart of an object tracking method according to an embodiment of the disclosure. Referring to FIG. 2, the detector 132 of the detection tracker 131 performs the object detection on one of one or more continuous image frames (step S210). Specifically, in some application scenarios, such as a video call, a video stream, a video monitoring, or a game, the processor 130 may obtain one or more image frames that are continuous (referred to herein as the continuous image frames). The continuous image frames refer to a collection of the adjacent image frames based on a frame rate (for example, measured in frames per second (FPS) or frequency) of the image capturing apparatus or the recorded image. For example, if the frame rate is 60 FPS, the 60 image frames within one second may be called the continuous image frames. However, the continuous image frames are not limited to the image frames within one second. For example, the continuous image frames may also be the image frames within one and a half seconds, two seconds, or two and one-third seconds.

In response to an input of the continuous image frames (for example, from the image capturing apparatus, the server, or the storage medium, and may be stored in the storage 110), the detector 132 accesses the one input continuous image frame from the storage 110. In an embodiment, in order to achieve real-time processing, the detector 132 may perform the object detection on the first continuous image frame that is currently input. In another embodiment, the detector 132 may perform the object detection on other input continuous image frames. That is, the first continuous image frame is ignored, or the multiple continuous image frames are ignored or passed. It should be noted that the first frame here refers to the first frame input at a certain time point or the first frame accessed to the storage 110 at the time point, and is not limited to an initial frame of the image or the video stream.

On the other hand, the description of the object detection may refer to the above description of the detector 132. Thus, details in this regard will not be further reiterated in the following.

Figure 3:
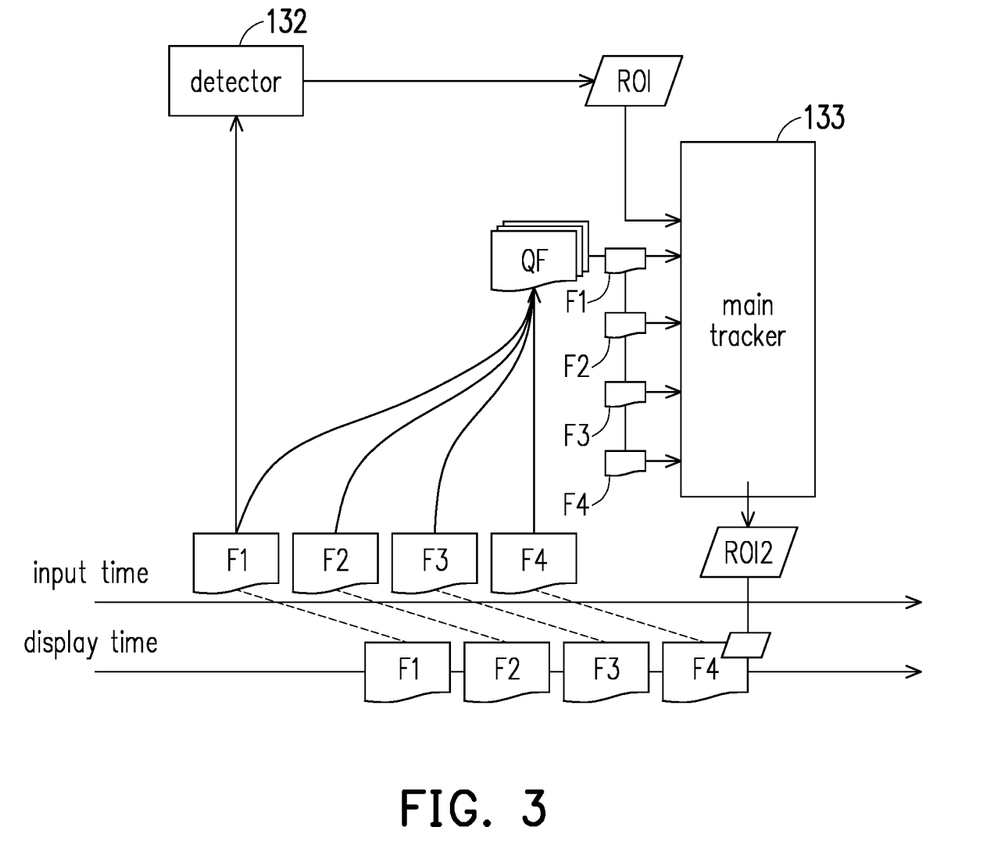
FIG. 3 is a schematic view of tracking continuous image frames according to an embodiment of the disclosure.

For example, FIG. 3 is a schematic view of tracking continuous image frames by the detection tracker 131 according to an embodiment of the disclosure. Referring to FIG. 3, the detector 132 decides a region of interest ROI corresponding to a position of the target in a first continuous image frame F1 of continuous image frames F1 to F4, and identifies the target in the region of interest ROI, accordingly. It should be noted that a second to a fourth continuous image frames F2 to F4 shown in FIG. 3 denote subsequent image frames of the first continuous image frame F1.

The processor 130 may temporarily store the one or more continuous image frames (step S230) to the buffer 111. Specifically, some low latency applications require real-time processing of the input, accessed, or captured images. The low latency applications are related to video applications where the time delay between an input time point of the one continuous frame image and an output time point of the same continuous frame image is within a specific allowable time, for example, the video call/conference, or live streaming. According to different requirements, the video applications may additionally provide a face detection, a brightness adjustment, a special effects processing or, other image processing. However, if an image processing period is too long, it will affect user experiences in the application. For example, in a real-time video conference, if a face detection period is too long, a movement of a head may cause a face position obtained from a detection result to deviate from a face position in a current output image, and the displayed image may not accurately select a human face. Therefore, in this embodiment of the disclosure, the continuous image frames received in the process of the object detection may be kept, so that a result of the object detection may update the tracking target in the kept image frame, and an output time point of the image frame may be later than an end time point of the object detection thereof.

In an embodiment, in all or a part of the period of the object detection in step S210, the processor 130 may temporarily store the one or more continuous image frames which are input (into a system, for example, the object tracking apparatus 100) in the period in the buffer 111. Taking FIG. 3 as an example, the detector 132 performs the object detection on the continuous image frame F1. Between the detector 132 receiving the continuous image frame F1 and obtaining the region of interest ROI in the continuous image frame F1, the storage 110 sequentially stores the continuous image frames F1 to F4. The processor 130 may use the continuous image frames F1 to F4 as a queue frame QF, and store the continuous image frames F1 to F4 in the buffer 111.

In another embodiment, the processor 130 may further temporarily store other continuous image frames accessed outside the period of the object detection. For example, the processor 130 temporarily stores the last continuous image frame before the period of the object detection or the next continuous image frame after the period of the object detection.

In still another embodiment, the processor 130 may temporarily store the one or more continuous image frames input to a system in all or a part of the period before the object tracking is completed.

It should be noted that, in the example shown in FIG. 3, all the continuous image frames in the period of the object detection are temporarily stored in the buffer 111. However, the disclosure is not limited thereto.

In an embodiment, the processor 130 may compare the temporarily stored continuous image frames with a maximum number. The maximum number is related to a space size of the buffer 111, a detection speed of the detector 132, or a requirement for processing efficiency. For example, the maximum number may be 8, 10, or 20. The processor 130 may delete at least one of the temporarily stored continuous image frames according to a comparison result of the continuous image frames and the maximum number. In response to the temporarily stored continuous image frames being equal to or greater than the maximum number, the processor 130 may delete a part of the continuous image frames in the buffer 111. For example, the processor 130 may delete the continuous image frames sorted in even or odd numbers, or randomly delete a certain number of the continuous image frames in the buffer 111. On the other hand, in response to the temporarily stored continuous image frames having not reached the maximum number, the processor 130 may keep all or a part of the continuous image frames in the buffer 111.

In another embodiment, if the space of the buffer 111 allows all the continuous image frames received in the period of the object detection, the processor 130 may keep the continuous image frames.

It should be noted that the maximum number may be fixed, or may change in response to factors such as a real-time processing speed of the detector 132, system computing complexity, and subsequent application requirements.

The main tracker 133 may perform the object tracking on the one or more temporarily stored continuous image frames according to the result of the object detection (step S250). In an embodiment, the result of the object detection includes a region of interest of the target. As region of interest ROI shown in FIG. 3, the region of interest ROI corresponds to the position of the target in the continuous image frame subject to the object detection. It should be noted that the region of interest ROI may completely or partially select the target, and the embodiment of the disclosure is not limited thereto. In some embodiments, the result of the object detection further includes the type of target.

On the other hand, the description of the object tracking may refer to the above description of the main tracker 133. Thus, details in this regard will not be further reiterated in the following.

In addition, in response to the completion of the object detection of one of the continuous image frames (that is, the result of the object detection is obtained, for example, the region of interest ROI of the continuous image frame F1 is detected as shown in FIG. 3), the main tracker 133 performs the object tracking on the one or more continuous image frames in the buffer 111. In other words, before the object detection of the first continuous image frame is completed, the main tracker 133 is disabled or does not track the first continuous image frame or other continuous image frames that are input subsequently.

In an embodiment, the main tracker 133 may decide a correlation of the region of interest in the result of the object detection between the temporarily stored continuous image frames, and determine another region of interest according to the correlation. The correlation is related to the position, the direction, and/or the speed of the one or more targets in the one or more regions of interest between the adjacent continuous image frames.

Taking FIG. 3 as an example, the main tracker 133 continuously tracks the target in the region of interest ROI obtained by the detector 132 in the continuous image frames F1 to F4, and updates a region of interest ROI2 as the target moves.

In an embodiment, it is assumed that the result of object detection includes a detection region of interest corresponding to the target (that is, corresponding to the position of the target in the continuous image frame subject to the object detection). In addition, it is assumed that a tracking region of interest refers to the region previously tracked by the object tracking. In other words, the tracking region of interest refers to the region of interest in which the object tracking is used as the basis for tracking in the one or more continuous image frames at the current time point or before the adjacent time point. The main tracker 133 may update the tracking region of interest targeted by the object tracking to the detection region of interest obtained by the object detection. In other words, the tracking region of interest is directly replaced by the detection region of interest.

Figure 4:
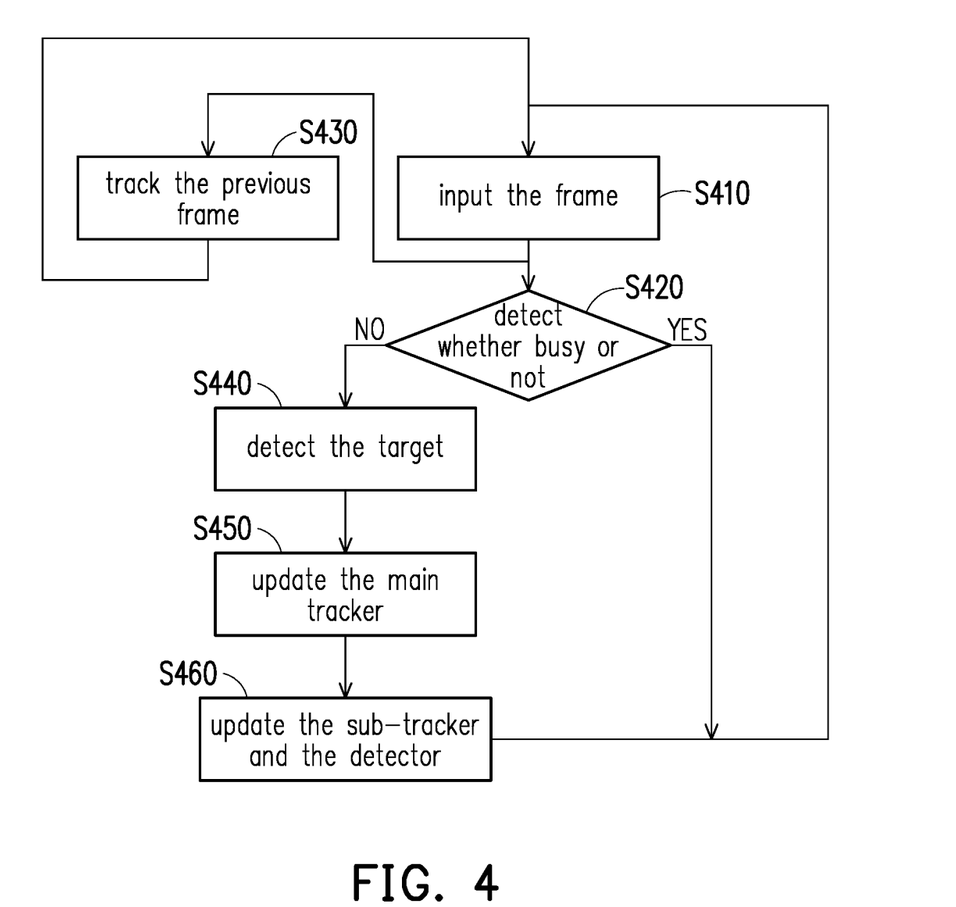
FIG. 4 is a flowchart of an update mechanism of a target according to an embodiment of the disclosure.

FIG. 4 is a flowchart of an update mechanism of a target according to an embodiment of the disclosure. Referring to FIG. 4, the processor 130 accesses the input continuous image frame from the storage 110 (step S410), and detects the target in the accessed continuous image frame through the detection tracker 131. In the meanwhile, the sub-tracker 135 may complete tracking the previous continuous image frame, and further determines whether the detection tracker 131 is busy or not (step S420). However, regardless of whether the detection tracker 131 is busy or not, the sub-tracker 135 still uses the region of interest obtained by the previous continuous image frame to track the target (step S430). On the other hand, if the detection tracker 131 is not busy, it means that a detection and tracking region of interest has been obtained (that is, the detector 132 completes the detection, and the main tracker 133 has completed tracking all the temporarily stored continuous images) (step S440). The main tracker 133 may use the new region of interest output by the detector 132 to update the region of interest that is tracked currently (that is, the tracking target is updated.) (step S450). After the continuous tracking is completed/finished and all the continuous image frames are temporarily stored, the detection and tracking region of interest is obtained, which is compared or calculated with the tracking region of interest obtained by the tracking of the sub-tracker 135. One of the detection and tracking region of interest and the tracking region of interest is chosen, or a mixed computation is performed, so as to obtain a final region of interest, which is configured to update the region of interest currently tracked by the sub-tracker 135 (step S460).

In an embodiment, the processor 130 may disable the object tracking on the previous tracking region of interest according to the time generated by a result of the object detection and tracking. Assuming that the detection tracker 131 generates the result of the detection and tracking when the sub-tracker 135 starts a round of tracking but has not finished yet, the sub-tracker 135 may be disabled or not perform the object tracking before starting the next round of detection and tracking. In the next cycle of the object tracking, the sub-tracker 135 directly starts tracking based on the result of the detection and tracking.

Figure 5:
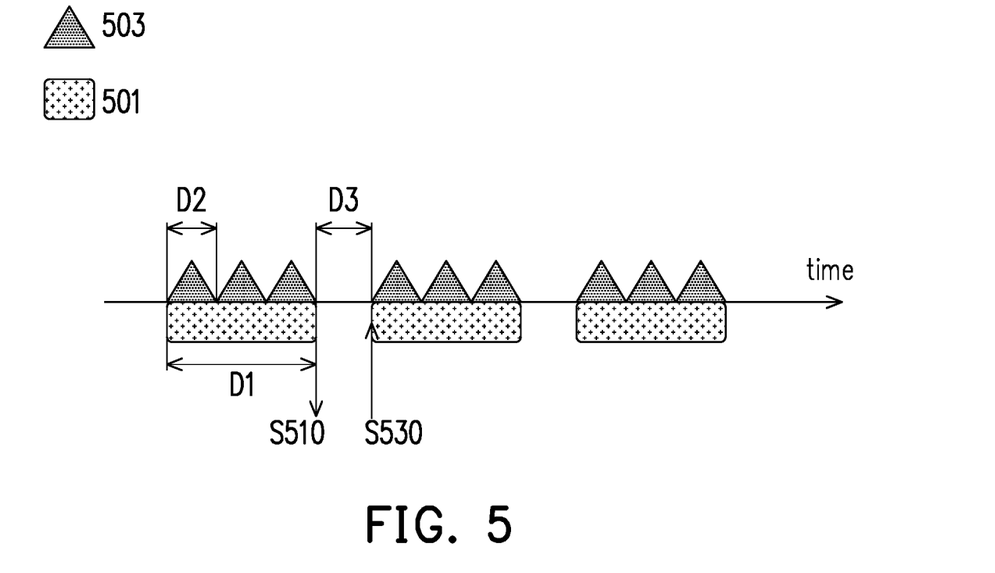
FIG. 5 is a timing diagram of an object detection and tracking according to an embodiment of the disclosure.

For example, FIG. 5 is a timing diagram of an object detection and tracking according to an embodiment of the disclosure, which is configured to explain a decision mechanism of step S460 in FIG. 4 in detail. Referring to FIG. 5, in a period D1 when the detection tracker 131 performs an object detection and tracking 501, an object tracking 503 of the sub-tracker 135 completes tracking the two continuous image frames. During the object tracking 503 on the third continuous image frame performed by the sub-tracker 135, the detection tracker 131 has completed or almost completed the object detection and tracking 501. That is, in a period D2 of the third object tracking 503, the detection tracker 131 performs the object detection and tracking 501, and accordingly obtains the new region of interest (step S510). In a certain period before and after the object detection and tracking 501 is turned on by the detection tracker 131 next time, the object tracking 503 may perform tracking based on the new region of interest obtained by the object detection and tracking 501 (step S530). In another embodiment, the sub-tracker 135 that restarts tracking may perform the object tracking 503 based on the latest detection and tracking region of interest obtained by the object detection and tracking 501 and the tracking region of interest obtained by the previous object tracking 503. For example, the sub-tracker 135 may use a weighted average of both the detection and tracking region of interest and the tracking region of interest. A weight used in the weighted average may be changed according to the user requirements, and the embodiment of the disclosure is not limited thereto. In addition, the sub-tracker 135 may select one of the detection and tracking region of interest and the tracking region of interest.

In an embodiment, the processor 130 may determine a time difference between the time point when the latest object detection and tracking 501 is completed and the time point when the latest object tracking 503 is completed. The time difference denotes whether the time point of the latest result obtained by the sub-tracker 135 is close to the time point of the latest result obtained by the detection tracker 131. The sub-tracker 135 and the detection tracker 131 may decide whether to use both the detection and tracking region of interest and the tracking region of interest to perform the object tracking and the object detection according to the time difference.

Figure 6:
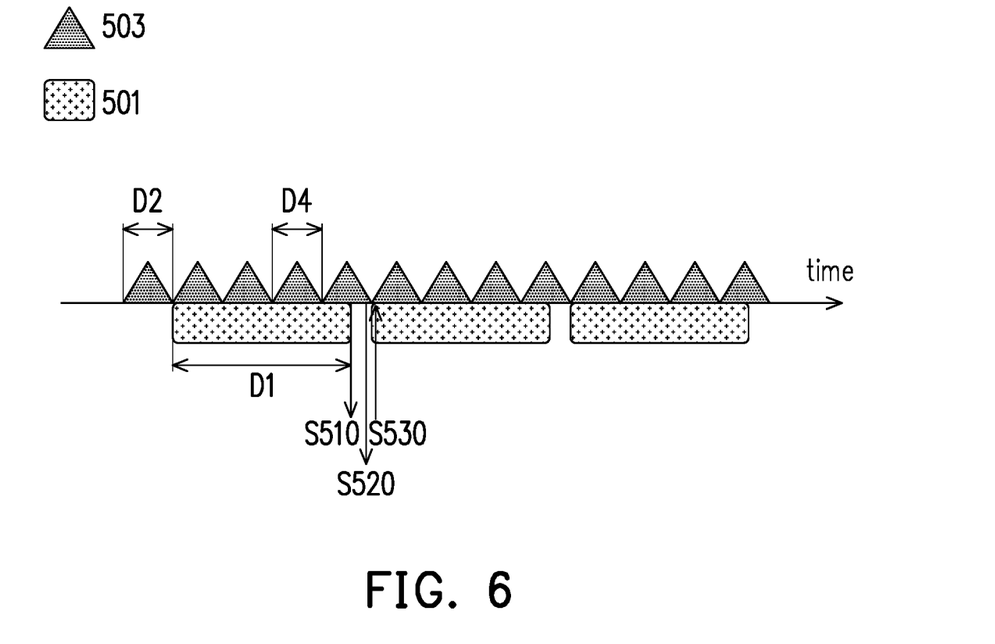
FIG. 6 is a timing diagram of an object detection and tracking according to another embodiment of the disclosure.

For example, FIG. 6 is a timing diagram of an object detection and tracking according to another embodiment of the disclosure. Referring to FIG. 6, the object tracking 503 has been performed continuously without considering whether the object tracking 503 obtains a result. However, the sub-tracker 135 may determine a time difference between an end of the period D1 and a result of a cycle D4, and compare the time difference with a difference threshold. If the time difference is less than the difference threshold, the object tracking 503 may use the weighted average of the region of interest obtained in the cycle D4 and the region of interest obtained by the object detection and tracking 501 in the period D1. On the other hand, if the time difference is not less than the difference threshold, the object tracking 503 and the object detection and tracking 501 only use the region of interest obtained by the object detection and tracking 501 in the period D1.

In an embodiment, assuming that the period of the object detection is not recorded, the sub-tracker 135 may decide to update the tracking region of interest to the detection and tracking region of interest (that is, the result of the object detection and tracking) according to a confidence level of the tracking region of interest (that is, the region previously tracked by the sub-tracker 135) in the object tracking. In some application scenarios, the target of the object tracking may be suddenly obscured, so that the confidence level of the result of the object tracking may be relatively low (for example, less than a confidence threshold). At this time, when the object tracking of the sub-tracker 135 is completed, the sub-tracker 135 may be updated to the result of the object detection and tracking or use the weighted average of both the detection and tracking region of interest and the tracking region of interest, and the sub-tracker 135 may be used as the final region of interest.

Figure 7:
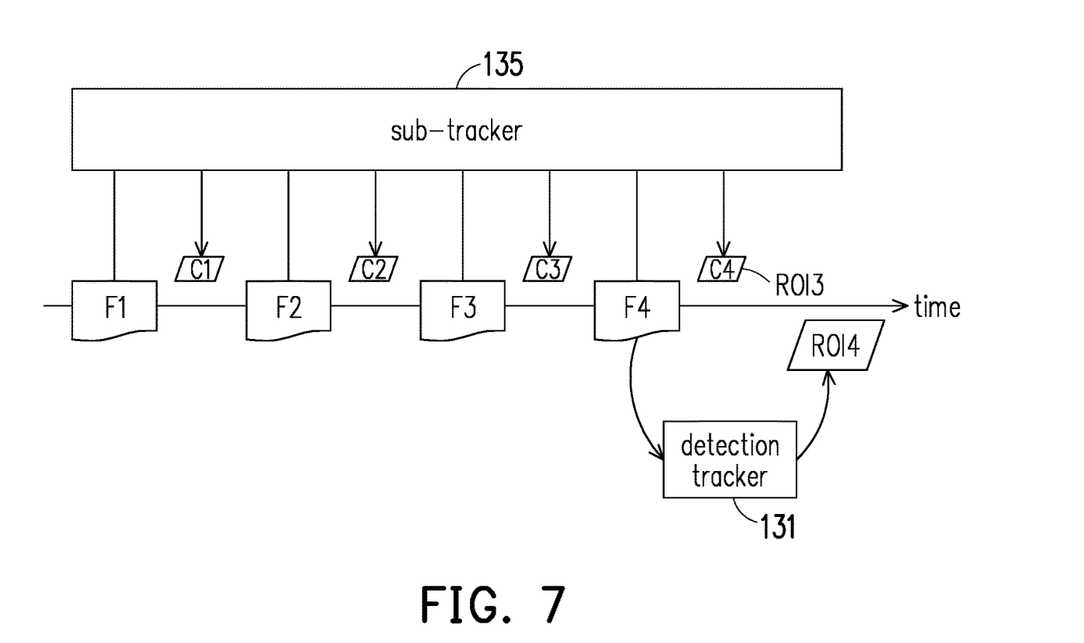
FIG. 7 is a timing diagram of an update mechanism of a target according to an embodiment of the disclosure.

For example, FIG. 7 is a timing diagram of an update mechanism of a target according to an embodiment of the disclosure. Referring to FIG. 7, it is assumed that a confidence level C4 of a region of interest ROI3 in confidence levels C1 to C4 of the sub-tracker 135 for results of the continuous image frames F1 to F4 is less than the confidence threshold. At this time, the sub-tracker 135 may update the region of interest ROI3 to a region of interest ROI4 obtained by the detection tracker 131. For another example, if a quantity of the confidence levels C1 to C4 that is less than the confidence threshold is greater than a quantity threshold, the sub-tracker 135 may also update the region of interest ROI3 to the region of interest ROI4 obtained by the detection tracker 131. For still another example, the sub-tracker 135 may also use a weighted average of the regions of interest ROI3 and ROI4, and a weight of the region of interest ROI3 may be relatively low.

In an embodiment, the sub-tracker 135 may decide to update the tracking region of interest (that is, the region previously tracked by the sub-tracker 135) to the detection and tracking region of interest (that is, the result of the object detection and tracking) according to a detection result of a scene transition. The scene transition is related to different scenes of the two adjacent continuous image frames. The processor 130 may determine a degree of changing of the background color, contrast ratio, or specific pattern, and accordingly obtain the detection result of the scene transition (for example, the scene is different/has been transited or the same/not transited). For example, if the degree of changing is greater than a changing threshold, the detection result is that the scene has been transited, and the sub-tracker 135 may update the region of interest. For another example, if the degree of changing is not greater than the changing threshold, the detection result is that the scene has not been transited, and the sub-tracker 135 may maintain the tracking region of interest or use both the detection and tracking region of interest and the tracking region of interest.

Figure 8:
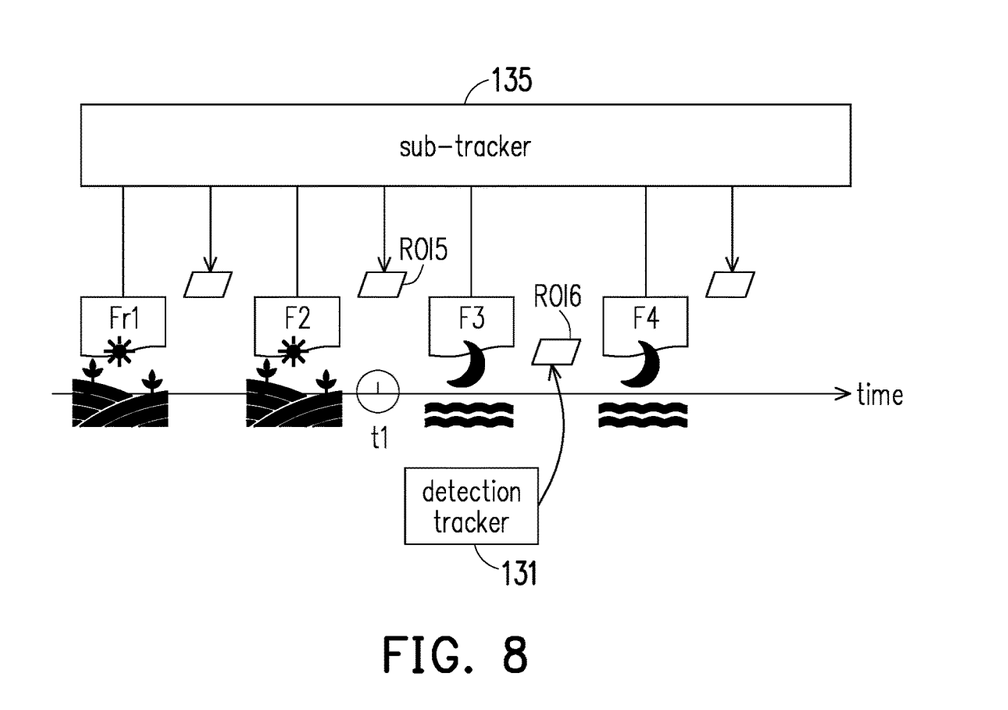
FIG. 8 is a timing diagram of an update mechanism of a target according to another embodiment of the disclosure.

For example, FIG. 8 is a timing diagram of an update mechanism of a target according to another embodiment of the disclosure. Referring to FIG. 8, it is assumed that the processor 130 detects that the scene transition has been transited at a time point t1. For example, a content of the continuous image frame F2 is in the daytime, but a content of the continuous image frame F3 is at night. In addition, for the continuous image frame F3, the sub-tracker 135 may update a region of interest ROI5 obtained by the continuous image frame F2 to a region of interest ROI6 lately output by the detection tracker 131.

In an embodiment, in response to the completion of the object tracking on one of the one or more continuous image frames, the processor 130 may request to display the result of the object tracking. For example, the processor 130 may display the continuous image frame and the region of interest selected by the object tracking through the display.

Taking FIG. 3 as an example, Table (1) is a table illustrating a timing relationship.

TABLE 1

| | | | | | | | | |
|---|---|---|---|---|---|---|---|---|
| detector | F1 | F1 | F1 | F1 | | | | |
| main tracker | | | | | F1 | F2 | F3 | F4 |
| input | F1 | F2 | F3 | F4 | | | | |
| display | | F1 | F2 | F3 | | | F4 | |

In the period when the detector 132 detects the continuous image frame F1, the processor 130 inputs the continuous image frames F1 to F4 to the buffer 111. In the meanwhile, the continuous image frames F1 to F3 displayed by the display have not had the result of the object detection or the object tracking. When the display displays the continuous image frame F4, the main tracker 133 may use the region of interest output by the detector 132 to track the targets in the temporarily stored continuous image frames F1 to F4, and may display the result of the object tracking accordingly (as the region of interest ROI2 in the continuous image frame F4 shown in FIG. 3). In other embodiments, the region of interest ROI2 is used to compare or calculate with the tracking region of interest tracked by the sub-tracker 135. One of the region of interest ROI2 and the tracking region of interest is chosen, or the mixed computation is performed, so as to obtain the final region of interest. When the display displays the continuous image frame is F4, the final region of interest is displayed at the same time.

In an embodiment, the detector 132 may perform the object detection on the image frames after the continuous image frames temporarily stored by the buffer 111, and disable or not perform the object detection on other continuous image frames temporarily stored by the buffer 111. In other words, the detector 132 disables or does not perform the object detection on all the input continuous image frames. A detection period of the detector 132 for a single frame may be much longer than a tracking period of the main tracker 133 for a single frame, and the detection period may not even meet the requirements of low latency in the application scenarios. After the detector 132 outputs a result, other continuous image frames in the detection period may have been requested for output or other processing multiple times. As shown in Table (1), the display outputs the continuous image frames F1 to F3, but the detector 132 is still performing the object detection on the continuous image frame F1. In response to the output of the result of the object detection, the detector 132 may directly perform the object detection on the newly input continuous image frame, while disabling or not continuing to perform the object detection on other temporarily stored continuous image frames. Taking FIG. 3 as an example, the detector 132 detects the image frame input after the continuous image frame F4.

In another embodiment, the detection tracker 131 starts the object detection on the newly input continuous image frame according to a fixed time interval, a fixed interval of the quantity of the image frame, or the detection result of the scene transition, and any object detection is an independent event, regardless of whether there is still an unfinished object detection. When the result of any object detection and tracking is output, it is configured to update the output of the result of the previous object detection and tracking. Since the time taken in each detection and tracking is variable, the previous object detection and tracking here is determined by the time point of the output result. In another embodiment, the detection tracker 131 selects which frame of the continuous image frames to perform the object detection according to the fixed time interval, the fixed interval of the quantity of the image frame, or the detection result of the scene transition. A starting time point of the detection tracker 131 may be slightly earlier or later than the previous embodiment according the fixed time interval, the fixed interval of the quantity of the image frame, or the detection result of the scene transition. However, after starting, according to a detection result of the fixed time interval, the fixed interval of the quantity of the image frame, or the scene transition, the one specific frame in the continuous image frames is chosen to perform the object detection, and the previous object detection or object tracking is optionally stopped, so as to increase the flexibility of the starting time point of the detection tracker 131.

Based on the above, in the object tracking method and the object tracking apparatus according to the embodiments of the disclosure, the target in the temporarily stored continuous image frame may be tracked based on the result of the object detection. In this way, regardless of the type of the target (for example, the human, the animal, or a non-living creature), the accuracy of the object tracking may be improved. In addition, in view of the high processing efficiency of the tracker, the embodiments of the disclosure may satisfy the requirements of real-time video or other low latency applications.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An object tracking method for a low latency application, wherein the object tracking method comprises:
    performing an object detection on one of at least one continuous image frame, wherein the object detection is configured to identify a target;
    temporarily storing the at least one continuous image frame;
    performing an object tracking on the at least one continuous image frame that is temporarily stored according to a result of the object detection, wherein the object tracking is configured to associate the target in one of the at least one continuous image frame with the target in another of the at least one continuous image frame, the result of the object detection comprises a first region of interest of the target, the first region of interest corresponds to a position of the target in the one continuous image frame subject to the object detection, and performing the object tracking on the at least one continuous image frame that is temporarily stored according to the result of the object detection comprises:
        deciding a correlation of the first region of interest between the continuous image frames that are temporarily stored, and deciding a second region of interest according to the correlation; and
    performing another object tracking on the one of the at least one continuous image frame to decide a third region of interest, comprising:
        determining a time difference between a time point when the second region of interest is obtained and a time point when a result of the another object tracking is obtained;
        in response to time difference is less than a difference threshold, deciding the third region of interest by using both the second region of interest and the result of the another object tracking; and
        in response to time difference is not less than the difference threshold, deciding the third region of interest by only using the second region of interest.

2. The object tracking method according to claim 1, wherein temporarily storing the at least one continuous image frame comprises:
    temporarily storing the at least one continuous image frame input to a system in all or a part of a period before the object detection and the object tracking are completed.

3. The object tracking method according to claim 1, wherein the at least one continuous image frame comprises a plurality of continuous image frames, and temporarily storing the at least one continuous image frame comprises:
    comparing the continuous image frames that are temporarily stored with a maximum number; and
    deleting at least one of the continuous image frames that are temporarily stored according to a comparison result of the continuous image frames and the maximum number.

4. The object tracking method according to claim 1, wherein the object tracking method further comprises:
    updating the third region of interest decided by the another object tracking to the second region of interest, and performing the another object tracking again according to the second region of interest.

5. The object tracking method according to claim 4, wherein updating the third region of interest decided by the another object tracking to the second region of interest comprises:
    deciding to update the third region of interest to the second region of interest or a weighted average of the second region of interest and the third region of interest according to a confidence level of the third region of interest in the another object tracking.

6. The object tracking method according to claim 5, wherein the object tracking method further comprises:
    when the another object tracking is completed, updating an output of a final region of interest with the second region of interest or the weighted average of the second region of interest and the third region of interest.

7. The object tracking method according to claim 1, wherein performing the object detection on the one of the at least one continuous image frame comprises:
    selecting which one of the at least one continuous image frame to perform the object detection on according to a time interval, an interval of a quantity of an image frame, or a detection result of a scene transition.

8. The object tracking method according to claim 1, wherein the object tracking method further comprises:
when the object tracking is completed, updating an output of a final region of interest with a result of the object tracking.

9. The object tracking method according to claim 1, wherein the object tracking method further comprises:
according to a time interval, an interval of a quantity of an image frame, or a detection result of a scene transition, starting another object detection on the another of the at least one continuous image frame before the object tracking is completed, wherein the another object detection is also configured to identify the target; and
optionally stopping the object detection or the object tracking.

10. An object tracking apparatus adapted for a low latency application, wherein the object tracking apparatus comprises:
a storage configured to store a program code; and
a processor coupled to the storage and configured to load and execute the program code to execute:
performing an object detection on one of at least one continuous image frame, wherein the object detection is configured to identify a target;
temporarily storing the at least one continuous image frame;
performing an object tracking on the at least one continuous image frame that is temporarily stored according to a result of the object detection, wherein the object tracking is configured to associate the target in one of the at least one continuous image frame with the target in another of the at least one continuous image frame, the result of the object detection comprises a first region of interest of the target, the first region of interest corresponds to a position of the target in the one continuous image frame subject to the object detection, and the processor is further configured for:
deciding a correlation of the first region of interest between the continuous image frames that are temporarily stored, and deciding a second region of interest according to the correlation; and
performing another object tracking on the one of the at least one continuous image frame to decide a third region of interest, comprising:
determining a time difference between a time point when the second region of interest is obtained and a time point when a result of the another object tracking is obtained;
in response to time difference is less than a difference threshold, deciding the third region of interest by using both the second region of interest and the result of the another object tracking; and
in response to time difference is not less than the difference threshold, deciding the third region of interest by only using the second region of interest.

11. The object tracking apparatus according to claim 10, wherein the processor is further configured for:
temporarily storing the at least one continuous image frame input to a system in all or a part of a period before the object detection and the object tracking are completed.

12. The object tracking apparatus according to claim 10, wherein the at least one continuous image frame comprises a plurality of continuous image frames, and the processor is further configured for:
comparing the continuous image frames that are temporarily stored with a maximum number; and
deleting at least one of the continuous image frames that are temporarily stored according to a comparison result of the continuous image frames and the maximum number.

13. The object tracking apparatus according to claim 10, wherein the processor is further configured for:
updating the third region of interest decided by the another object tracking to the second region of interest, and performing the another object tracking again according to the second region of interest.

14. The object tracking apparatus according to claim 13, wherein the processor is further configured for:
deciding to update the third region of interest to the second region of interest or a weighted average of the second region of interest and the third region of interest according to a confidence level of the third region of interest in the another object tracking.

15. The object tracking apparatus according to claim 14, wherein the processor is further configured for:
when the another object tracking is completed, updating an output of a final region of interest with the second region of interest or the weighted average of the second region of interest and the third region of interest.

16. The object tracking apparatus according to claim 10, wherein the processor is further configured for:
selecting which one of the at least one continuous image frame to perform the object detection according to a time interval, an interval of a quantity of an image frame, or a detection result of a scene transition.

* * * * *